(12) United States Patent
Banerjee et al.

(10) Patent No.: US 7,111,062 B2
(45) Date of Patent: Sep. 19, 2006

(54) APPARATUS AND METHOD OF GENERATING AN XML DOCUMENT TO REPRESENT NETWORK PROTOCOL PACKET EXCHANGES

(75) Inventors: Dwip N. Banerjee, Austin, TX (US); Rakesh Sharma, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 10/006,079

(22) Filed: Dec. 6, 2001

(65) Prior Publication Data

US 2003/0110285 A1    Jun. 12, 2003

(51) Int. Cl.
  *G06F 15/173* (2006.01)
(52) U.S. Cl. .................. 709/224; 714/39; 715/513
(58) Field of Classification Search ................ 709/224, 709/246; 714/39; 715/513; 370/229–235
  See application file for complete search history.

(56) References Cited

U.S. PATENT DOCUMENTS

| | | | | |
|---|---|---|---|---|
| 5,933,602 A | * | 8/1999 | Grover | 709/224 |
| 6,920,607 B1 | * | 7/2005 | Ali et al. | 709/223 |
| 6,931,574 B1 | * | 8/2005 | Coupal et al. | 714/39 |
| 6,954,789 B1 | * | 10/2005 | Dietz et al. | 709/224 |
| 2003/0028662 A1 | * | 2/2003 | Rowley et al. | 709/231 |
| 2003/0088665 A1 | * | 5/2003 | Sauermann | 709/224 |

OTHER PUBLICATIONS

Meek, Jon, "Wide Area Network Packet Capture and Analysis", USENIX Association, Proceedings of the 14th Systems Administration Conference (2000 LISA XIV), Dec. 3-8, 2000, pp. 255-264.*

* cited by examiner

*Primary Examiner*—Bharat Barot
*Assistant Examiner*—David Lazaro
(74) *Attorney, Agent, or Firm*—Volel Emile; Mark E. McBurney; Thomas E. Tyson

(57) ABSTRACT

A method, system and apparatus for generating an XML document to represent network protocol packet exchanges are provided. Each data packet consists of different internal fields. The fields are identified are used to generate the XML document. Specifically, the different fields are used as tagged element of the XML document.

16 Claims, 22 Drawing Sheets

```
<?XML VERSION="1.0"?>
<IP_HEADER>
  <TCP_HEADER APP="RLOGIN" SPORT="1023" SHOST="GIL" RPORT="LOGIN"
  RHOST="DEVO">
   <TCP_CONNECTION>
      <SYN_SENT WIN="4096" MSS="1024>768512:768512(0) </SYN_SENT>
      <SYN_RECEIVED WIN="4096" MSS="1024">947648:947648(0)
      </SYN_RECEIVED>
      <ACK__RECEIVED WIN="4096" MSS="1024">768513
      </ACK_RECEIVED>
      <ACK_SENT WIN="4096 RELATIVESEQ="YES">1
      </ACK_SENT>
   </TCP_CONNECTION>
  </TCP_HEADER>
</IP_HEADER>
```

```
<?XML VERSION="1.0"?>
<COMPANY NAME="INFORMATION STRATEGIES">
    <EMPLOYEES>
            <EMPLOYEE ID="1">HANK AARON</EMPLOYEE>
            <EMPLOYEE ID="2">BABE RUTH</EMPLOYEE>
    </EMPLOYEES>
</COMPANY>
```

FIG. 6

```
<EMPLOYEE ID="3">MICKEY MANTLE</EMPLOYEE>
<EMPLOYEE ID="4">TY COBB</EMPLOYEE>
```

FIG. 7

```
<?XML VERSION="1.0"?>
    <IP_HEADER>
     <TCP_HEADER>
      <TCP_CONNECTION>
          <SYN_SENT>SEQUENCE#</SYN_SENT>
          <SYN_RECEIVED>SEQUENCE#</SYN_RECEIVED>
          <ACK_RECEIVED>ACK#</ACK_RECEIVED>
          <ACK_SENT>ACK#</ACK_SENT>
      </TCP_CONNECTION>
     </TCP_HEADER>
    </IP_HEADER>
```

FIG. 8

```
<?XML VERSION="1.0"?>
 <XS:SCHEMA XMLNS:XS="HTTP://WWW.W3.ORG/2001/XMLSCHEMA>
  <XS:ELEMENT NAME="IP_HEADER">
  <XS:COMPLEXTYPE>
   <XS:SEQUENCE>
    <XS:ELEMENT NAME="TCP_HEADER">
    <XS:COMPLEXTYPE>
     <XS:SEQUENCE>
      <XS:ELEMENT NAME="TCP_CONNECTION">
      <XS:COMPLEXTYPE>
      <XS:SEQUENCE>
       <XS:ELEMENT REF="SYN_SENT" MINOCCURS="0" MAXOCCURS="1"/>
       <XS:ELEMENT REF="SYN_RECEIVED" MINOCCURS="0"
                   MAXOCCURS="1"/>
       <XS:ELEMENT REF="ACK_RECEIVED" MINOCCURS="0"
                   MAXOCCURS="UNBOUNDED"/>
       <XS:ELEMENT REF="ACK_SENT" MINOCCURS="0" MAXOCCURS=
                   "UNBOUNDED"/>
      </XS:SEQUENCE>
      </XS:COMPLEXTYPE>
      </XS:ELEMENT>
     </XS:SEQUENCE>
     </XS:COMPLEXTYPE>
    </XS:ELEMENT>
   </XS:SEQUENCE>
   </COMPLEXTYPE>
  </XS:ELEMENT>
 </XS:SCHEMA>
```

FIG. 11

```xml
<?XML VERSION="1.0"?>
    <IP_HEADER>
     <TCP_HEADER>
       <TCP_CLOSE-CONNECTION
         <FIN_SENT>SEQUENCE#</FIN_SENT>
         <ACK_RECEIVED>ACK#</ACK_RECEIVED>
         <FIN_RECEIVED>SEQUENCE#</FIN_RECEIVED>
         <ACK_SENT>ACK#</ACK_SENT>
       </TCP_CLOSE-CONNECTION>
     </TCP_HEADER>
    </IP_HEADER>
```

FIG. 12

```
<?XML VERSION="1.0"?>
 <XS:SCHEMA XMLNS:XS="HTTP://WWW.W3.ORG/2001/XMLSCHEMA>
  <XS:ELEMENT NAME="IP_HEADER">
   <XS:COMPLEXTYPE>
    <XS:SEQUENCE>
     <XS:ELEMENT NAME="TCP_HEADER">
      <XS:COMPLEXTYPE>
       <XS:SEQUENCE>
        <XS:ELEMENT NAME="TCP_CLOSE-CONNECTION">
         <XS:COMPLEXTYPE>
          <XS:SEQUENCE>
           <XS:ELEMENT REF="FIN_SENT" MINOCCURS="0"
                  MAXOCCURS="UNBOUNDED"/>
           <XS:ELEMENT REF="ACK_RECEIVED" MINOCCURS="0"
                  MAXOCCURS="UNBOUNDED"/>
           <XS:ELEMENT REF="FIN_RECEIVED" MINOCCURS="0"
                  MAXOCCURS="UNBOUNDED"/>
           <XS:ELEMENT REF="ACK_SENT" MINOCCURS="0" MAXOCCURS=
                  "UNBOUNDED"/>
          </XS:SEQUENCE>
         </XS:COMPLEXTYPE>
        </XS:ELEMENT>
       </XS:SEQUENCE>
      </XS:COMPLEXTYPE>
     </XS:ELEMENT>
    </XS:SEQUENCE>
   </COMPLEXTYPE>
  </XS:ELEMENT>
 </XS:SCHEMA>
```

FIG. 15

GIL.1023>DEVO.LOGIN:S 768512(0) WIN 4096 <MSS 1024>
DEVO.LOGIN>GIL.1023:S 947648:947648(0) ACK 768513 WIN 4096 <MSS 1024>
GIL.1023>DEVO.LOGIN: .ACK 1 WIN 4096

FIG. 16

```
<?XML VERSION="1.0"?>
<IP_HEADER>
  <TCP_HEADER APP="RLOGIN" SPORT="1023" SHOST="GIL" RPORT="LOGIN"
  RHOST="DEVO">
   <TCP_CONNECTION>
      <SYN_SENT WIN="4096" MSS="1024>768512:768512(0) </SYN_SENT>
      <SYN_RECEIVED WIN="4096" MSS="1024">947648:947648(0)
      </SYN_RECEIVED>
      <ACK__RECEIVED WIN="4096" MSS="1024">768513
      </ACK_RECEIVED>
      <ACK_SENT WIN="4096 RELATIVESEQ="YES">1
      </ACK_SENT>
   </TCP_CONNECTION>
  </TCP_HEADER>
</IP_HEADER>
```

FIG. 17

```
<CONNECTION_ESTABLISH>
         <PARAMETER_NEGOTIATION>
         <DATA_EXCHANGE>
            ...
         <WINDUP_OPERATIONS>
<CONNECTION_CLOSE>
```

FIG. 18

```
<?XML VERSION="1.0"?>
<IP_HEADER>
 <TCP_HEADER >
     <SYN_RECEIVED>SEQUENCE# </SYN_RECEIVED>
     <SYN_SENT>SEQUENCE#</SYN_SENT>
     <ACK_RECEIVED>ACK#</ACK RECEIVED>
     <ACK__SENT>ACK#</ACK_SENT>
 </TCP_HEADER>
</IP_HEADER>
```

FIG. 19

```
<?XML VERSION="1.0"?>
<IP_HEADER>
 <TCP_HEADER >
     <SYN_RECEIVED>SEQUENCE# </SYN_RECEIVED>
     <ACK_RECEIVED>ACK#</ACK RECEIVED>
     <ACK__SENT>ACK#</ACK_SENT>
 </TCP_HEADER>
</IP_HEADER>
```

FIG. 20

APPARATUS AND METHOD OF GENERATING AN XML DOCUMENT TO REPRESENT NETWORK PROTOCOL PACKET EXCHANGES

CROSS-REFERENCE TO RELATED APPLICATIONS

This application is related to U.S. Pat. No. 6,915,456, entitled APPARATUS AND METHOD OF DIAGNOSING NETWORK PROTOCOL ERRORS USING XML DOCUMENTS by the inventors herein, filed on even date herewith and assigned to the common assignee of this application.

This application is also related to co-pending U.S. patent application Ser. No. 10/006,059 (IBM Docket No. AUS920010871US1), entitled APPARATUS AND METHOD OF USING XML DOCUMENTS TO PERFORM NETWORK PROTOCOL SIMULATION by the inventors herein, filed on even date herewith and assigned to the common assignee of this application.

BACKGROUND OF THE INVENTION

1. Technical Field

The present invention is directed to communications networks. More specifically, the present invention is directed to a method and apparatus for generating an XML document to represent network protocol packet exchanges.

2. Description of Related Art

Most network application programs exchange data using data packets. Typically, a packet has a specific structure that incorporates internal fields that clearly delineate the packets' different contents. Using this structural representation, a user may devise algorithms that may be used to effectuate network simulation testing to debug network problems etc. The algorithms may be devised using a markup language. A markup language is a language that allows additional text or tags that are invisible to users to be inserted into a document. Thus, the tags are not part of the content of the document but rather enhance the document. For example, the tags may be used to structure the document or to add hypertext capability to the document etc.

One of the markup languages that is particularly well suited for this task is the extensible Markup Language or XML. XML is a language that is especially designed for Web documents. It allows designers to create their own customized tags, enabling definition, transmission, validation, and interpretation of data between applications and between organizations.

Consequently, what is needed is an apparatus and method of generating an XML document to represent network protocol packet exchanges.

SUMMARY OF THE INVENTION

The present invention provides a method, system and apparatus for generating an XML document to represent network protocol packet exchanges. Each data packet consists of different internal fields. The fields are identified are used to generate the XML document. Specifically, the different fields are used as tagged element of the XML document.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a sample XML document.

FIG. 7 depicts added elements to the sample XML document in FIG. 6.

FIG. 8 depicts an XML document representing generic packet exchanges of a TCP/IP setup connection.

FIG. 11 depicts an XML schema for a generic TCP/IP setup connection.

FIG. 12 depicts an XML document representing packet exchanges for a generic TCP/IP close connection process.

FIG. 15 depicts an XML schema for packet exchanges in a generic TCP/IP close setup connection.

FIG. 16 depicts packet exchanges for a TCP/IP login setup connection.

FIG. 17 an XML document of the TCP/IP login setup connection.

FIG. 18 is a high level output of a parser that has parsed a TCP/IP data transaction from establishing a connection to closing the connection.

FIG. 19 is a first example of an XML document representing a generic TCP/IP setup connection that has not been well formed.

FIG. 20 is a second example of an XML document representing a generic TCP/IP setup connection that has not been well formed.

DETAILED DESCRIPTION OF THE PREFERRED EMBODIMENT

Figure 1:
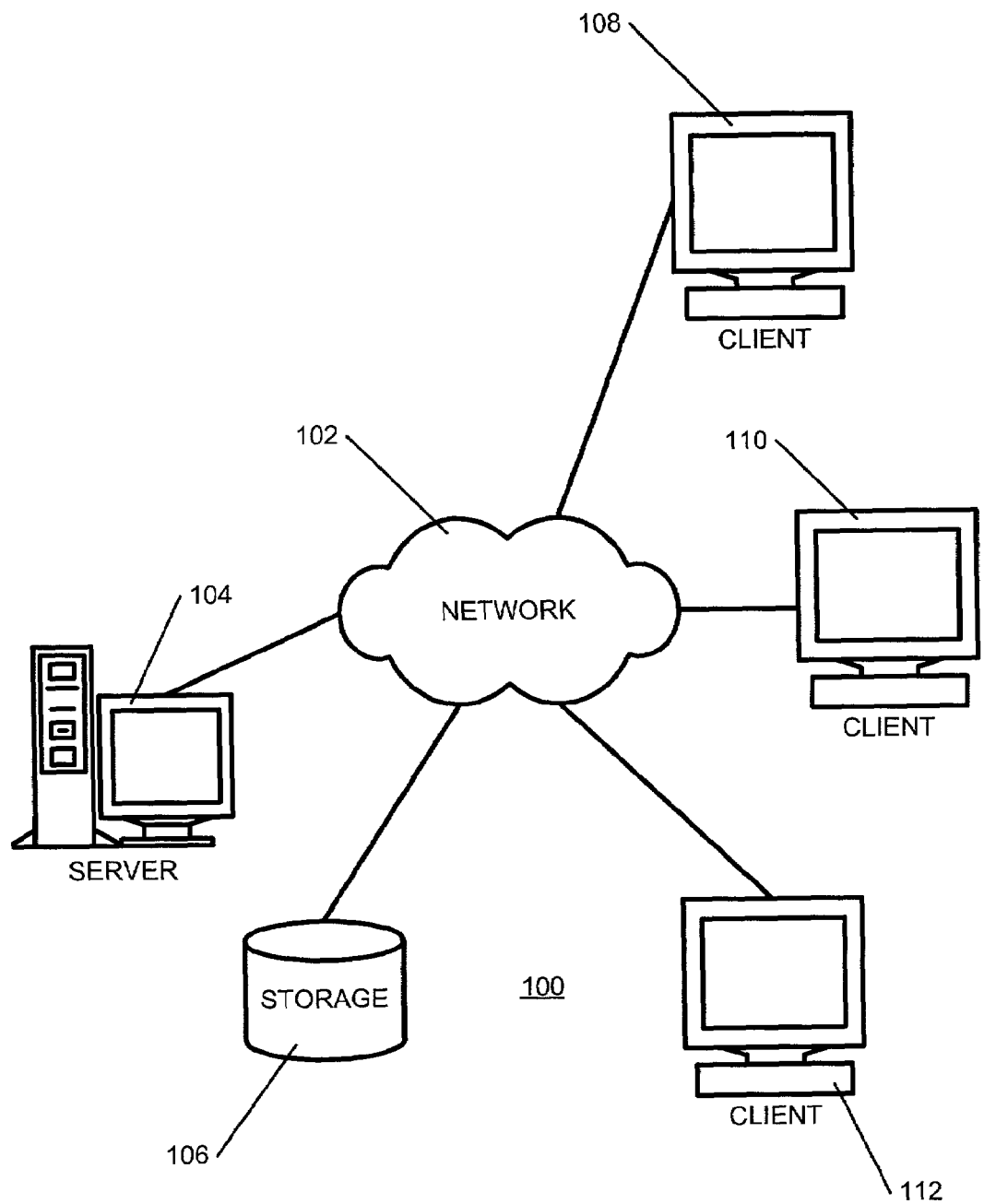
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
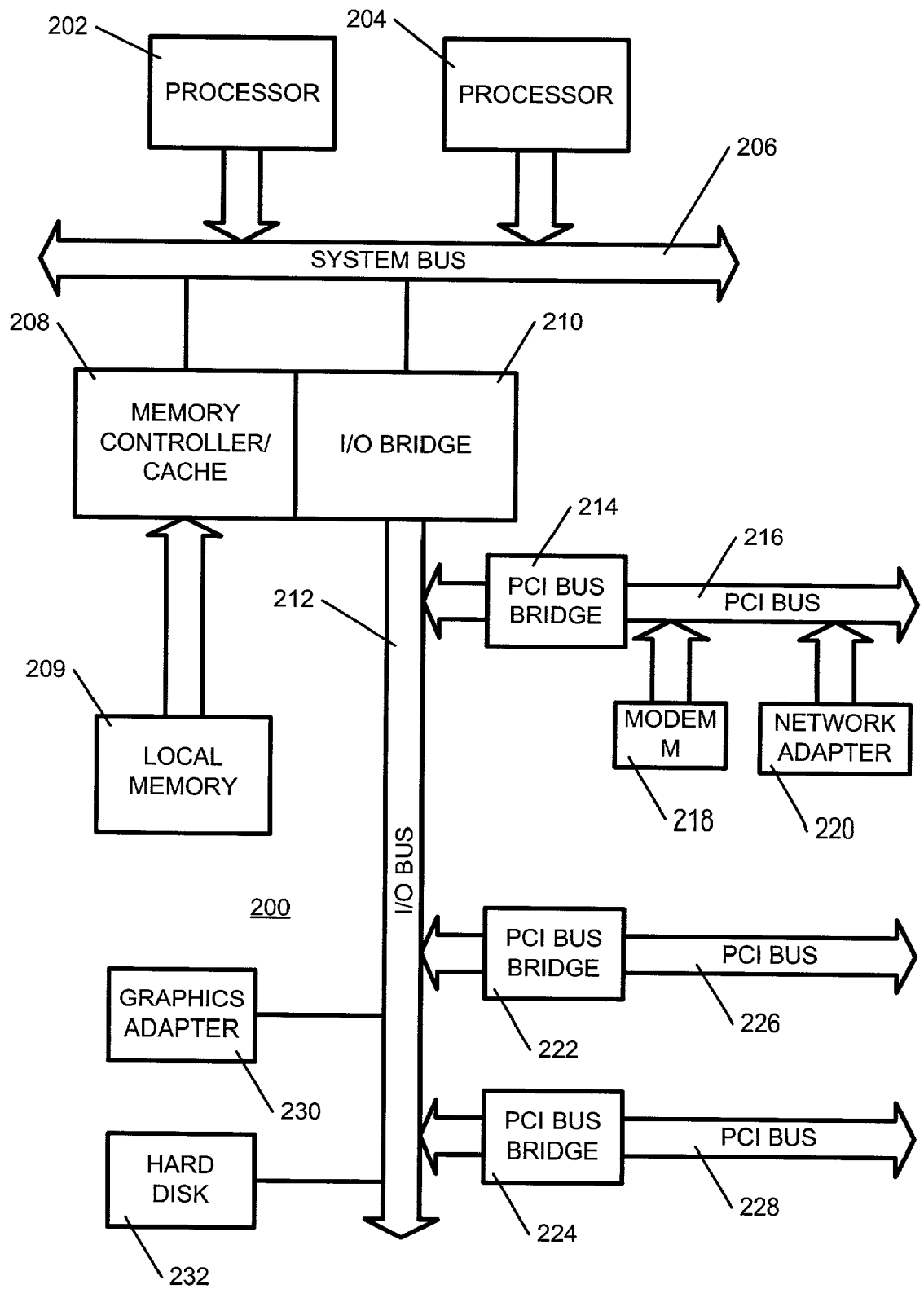
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pseries system, a product of International Business Machines Corporation in Armonk, N.Y., running the Advanced Interactive Executive (AIX) operating system or LINUX operating system.

Figure 3:
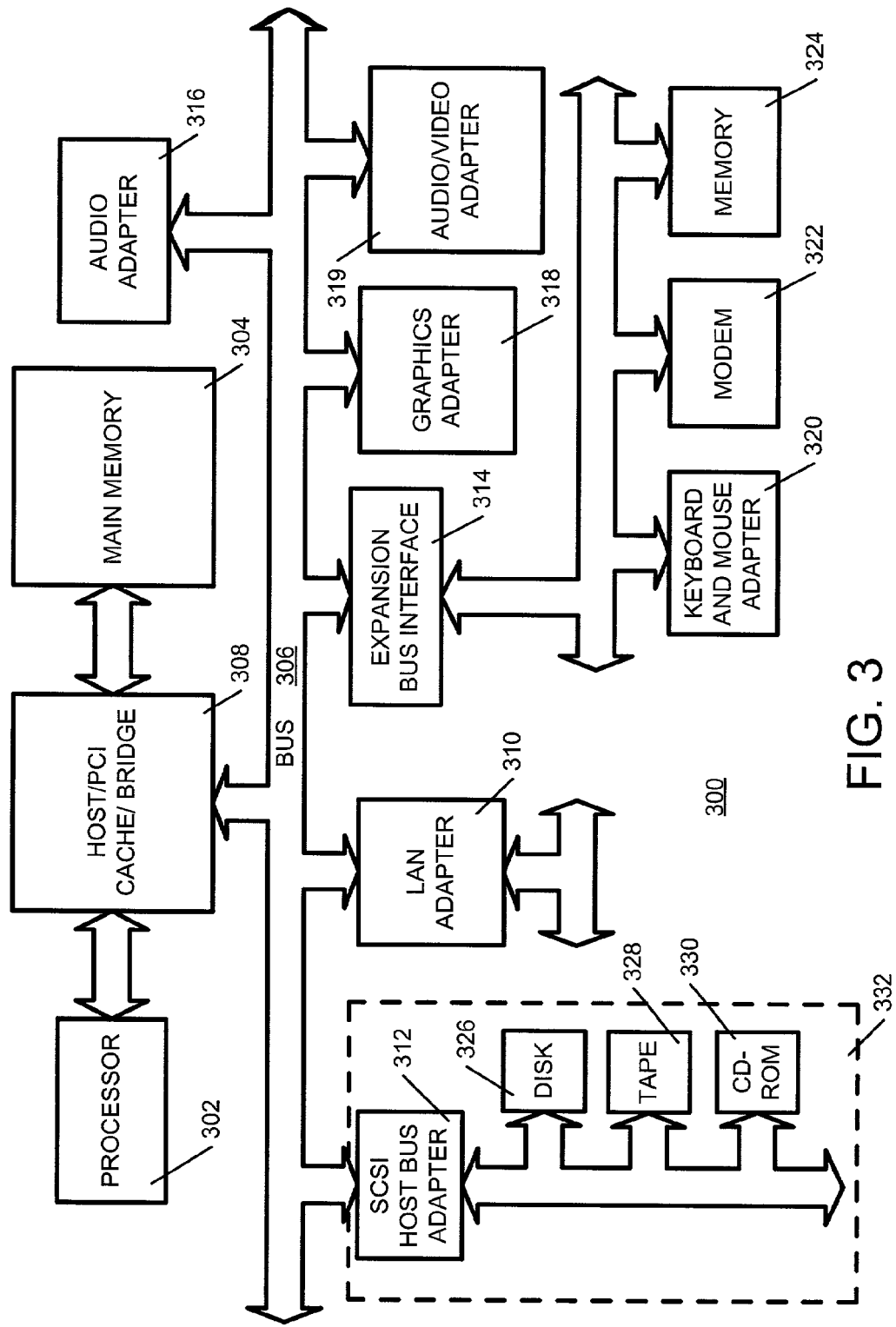
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of generating an XML document to represent network protocol packet exchanges. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

The bulk of communications occurring over the Internet is done using TCP/IP (Transmission Control Protocol/Internet Protocol). Accordingly, the present invention will be described using TCP/IP. Nonetheless, it should be understood that the invention is not restricted to only TCP/IP. Any other type of network communication protocol may be used and would be well within the scope and spirit of the invention.

Overview of Internet Communications

Since TCP/IP will be used to explain the present invention, a general description of TCP/IP is therefore warranted. The TCP/IP protocol is typically implemented as a layered protocol stack where data packets are processed layer by layer. As an example, a typical network transaction using TCP/IP is the transfer of e-mail messages over the Internet. For a user to send an e-mail message to a recipient, the user has to fill in the e-mail address of the recipient and type in the text of the message. Then, the user has to assert the "send" button.

When the "send" button is asserted, the text of the message (or the message) is sent to a TCP layer. If the message is too long, for example when a large file is attached to the message, the TCP layer will break the message up into datagrams or data packets and adds a header in front of each data packet. The TCP header will be described later. The TCP layer will then send each data packet (including the added header) to an IP layer. The IP layer then puts an IP header to the data packet that includes a source IP address and a destination IP address. Using the IP addresses, each data packet will then be sent to the recipient over the Internet.

Figure 4:
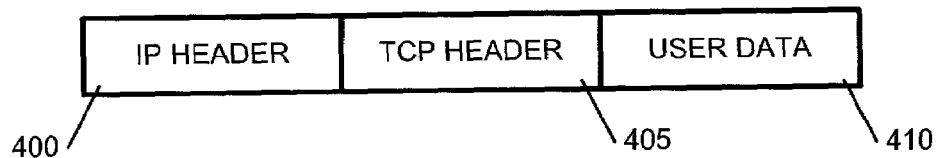
FIG. 4 depicts a TCP/IP data packet.

FIG. 4 depicts each data packet that is transmitted over the Internet. As stated above, TCP header 405 is first added to user data 410 (e.g., data packet). Then, IP header 400 is added. Once this is completed, the data packet is allowed to enter the Internet. The IP header ensures that the data reaches the target computer system while at the same time it lets the target system know where the message originates. In the case of accessing Web pages, the IP application protocol may be regarded as the application program that opens up a communication line between the two computer systems so that data may be transmitted back and forth.

Upon receiving a data packet, the target computer system sends the packet to an IP layer where the IP header is stripped off. The resulting data packet is then sent to a TCP layer. The TCP layer then strips the TCP header off the packet and collects all the packets in order to reconstruct the message. Once reconstructed, the message is sent to a mail application protocol. Using the e-mail address of the intended recipient, the mail application protocol then puts the message into the mailbox of the recipient.

TCP Header

Figure 5:
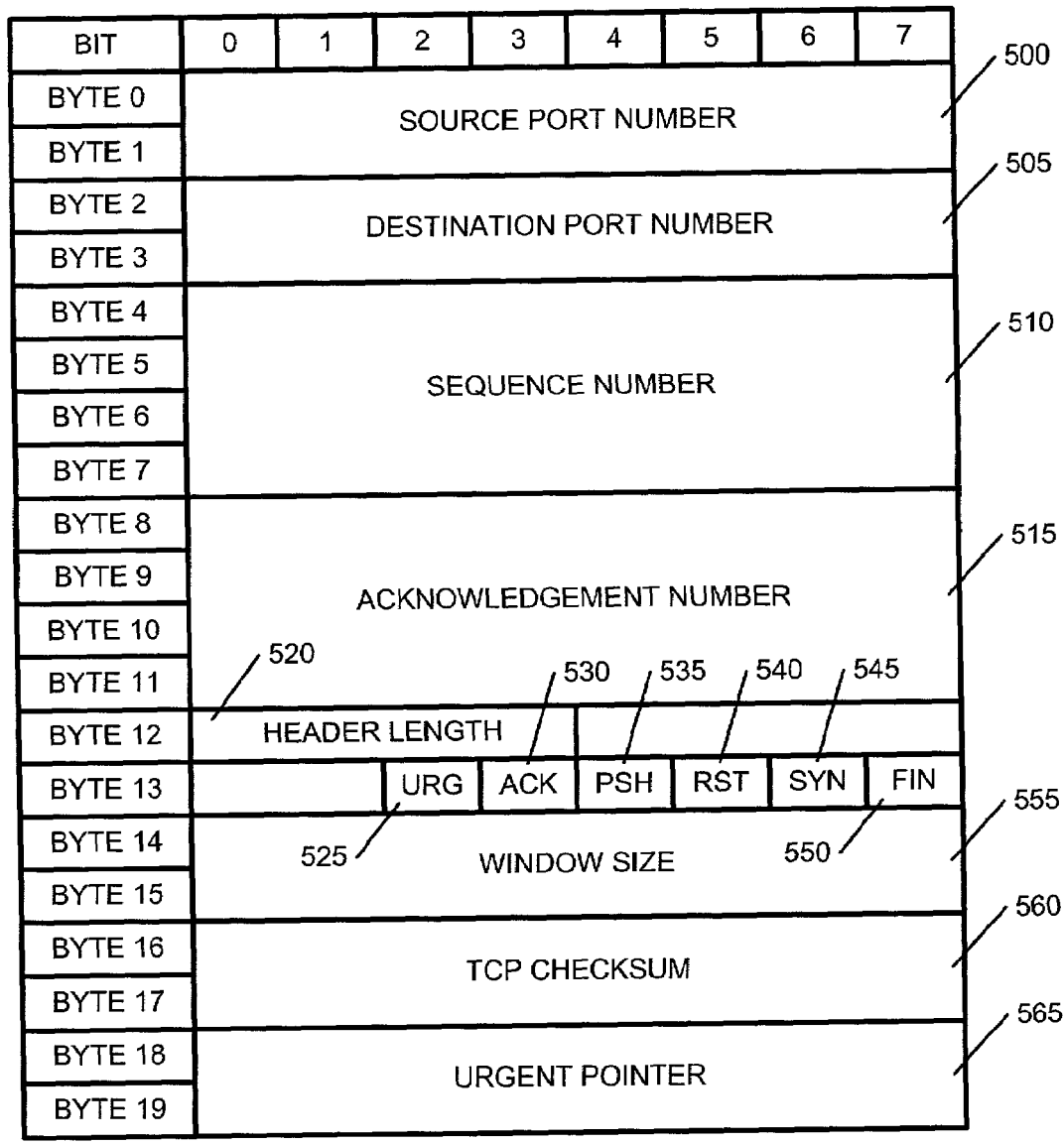
FIG. 5 depicts a TCP header format.

Since the IP header is not important to explain the invention, it will not be described. The TCP header will now be briefly described. FIG. 5 depicts a TCP header format. The first two bytes of the TCP header is 16-bit source port number 500. The next two bytes of the TCP header is the 16-bit destination port number 505. The port numbers are used to keep track of different conversations. For example, if a server is communicating with three different clients, the server will use a particular port number to communicate with each one of the clients. Thus, the 16-bit source port number 500 and the 16-bit destination port number 505 in conjunction with the IP address in the IP header identify a unique connection. This unique connection is often referred to as a socket.

Each datagram or data packet has a 32-bit sequence number 510. The sequence number is used to let the receiving computer system know the order of the particular packet in the stream of packets. It is also used by the receiving computer system to notify the sending computer system that all packets have been received up to a certain number. TCP does not number the datagrams but rather numbers the octets (8-bit data) in each datagram. Thus, if there are 500 octets in each datagram or packet, the first datagram may have a sequence number of "0", the second "500", the third "1000" etc.

In order to ensure that a datagram has been received, the recipient has to send back a 32-bit acknowledgement response to the sender. For example, if a recipient sends an acknowledgement of 1500, it is telling the sender that it has received all the data up to octet number 1500. If the sender does not get an acknowledgement response within a predetermined time, it will resend the data. When a data sender receives a new value, it can dispose of data that was held for possible re-transmission. The acknowledgement number is only valid when ACK flag 530 is set.

The 16-bit window size 555 represents the number of bytes starting with the byte specified in the acknowledgement number field 510 that the receiver is willing to accept. Stating differently, the window is used to control how much data can be in transit at any one time. It, in a way, advertises the amount of buffer space that has been allocated for the connection. The window size is used because it is not practical to wait for each datagram to be acknowledged before sending the next one, lest data transactions over the Internet may be too slow. On the other hand, a sender cannot just keep sending data, or a fast computer system might overrun the capacity of a slow one. Thus, each computer system indicates how much new data it is currently prepared to absorb by putting the number of octets in its 16-bit window. As a recipient receives data, its window size will decrease until it reaches zero (0). At that point, the sender has to stop. As the receiver processes the data, it will increase its window size signaling that it is able to accept more data. Often times, the same datagram may be used both to acknowledge receipt of a set of data and to give transmission permission for additional new data.

The 4-bit header length 520 indicates the size of the entire TCP header. In FIG. 5, options, padding, reserve and a few other fields are not shown. The options field depends on the number of options set and thus is of variable length. Accordingly, there is not a pre-determined length for the TCP header. Hence, the length of each header has to be indicated.

When one-bit URG 525 is used, it indicates that the 32-bit urgent pointer field 565 is valid. As mentioned before, when one-bit ACK 530 is set, the 32-bit acknowledgement number 515 is valid. One-bit PSH 535 is used to instruct the receiver to pass the data received thus far immediately to the receiving application. RST 540 is used to tell the receiver to re-establish connection. This usually indicates that an error condition has been detected. SYN bit 545 synchronizes the sequence numbers to begin a connection and FIN bit 550 indicates that the sender has sent all data in a stream. If both ends of a communication have sent the FIN flag, the connection will be closed.

The 16-bit checksum 560 ensures that the TCP header and data have not been modified in transit. If the checksum is invalid, the receiver will not acknowledge the message. The value in 16-bit urgent pointer 565 points to the end of data field that is considered urgent and requires immediate attention. This field is not valid if URG bit 525 is not set.

Establishing a TCP/IP Connection

To establish a TCP connection, an active computer system (e.g., a client) has to initiate communication with a passive computer system (e.g., a server) by sending a SYN packet (i.e., a packet with SYN bit 545 set) with the sequence number 510 set to an arbitrary value J. The server will then respond with a SYN, ACK packet (i.e., both the SYN bit 545 and the ACK bit 530 are set) with the acknowledgement number 515 set to J+1 and the sequence number 510 set to a further arbitrary number K. The client then responds to the SYN, ACK packet with an ACK packet with the acknowledgement number set to K+1. Note that in this case, both K and J are integers. Note also that only the parameters of importance for the connection to be established are described. However, other parameters such as window size etc. will also be included in the packets. Once the connection is established, user data packets may then be transmitted.

The above scenario may be interpreted as the client and server negotiating parameters such as window size etc. to use when transferring the user data packets. The smaller of the two parameters are used to actually transmit the user data.

Closing a TCP/IP Connection

The TCP/IP connection may be closed when the application program running on the client makes a close ( ) system call on the open socket. When this occurs the client will send a FIN packet (i.e., the FIN bit 550 set) to the server with the sequence number 510 set to J. When the server receives the FIN packet, it passes an "end-of-file" indication to the software. At that time, the server will send an ACK packet to the client with the acknowledgement number 515 set to J+1. The server will again send another packet, a FIN packet to the client with the sequence number set to K. The client will then respond with an ACK packet with a K+1 acknowledgement number. The TCP connection will then be closed.

Note that there are many existing methods of closing a TCP/IP connection. The method outlined above is the most often used method.

Brief Description of an XML Document

FIG. 6 is an example of an XML document. The header of the document tells a user that this is an XML document that has been written using version 1.0 of the XML specification. The greater than (">") and the less than ("<") signs are tags. They indicate the opening and closing of an element. Elements are the basic building blocks of an XML document. They may contain text, comments, or other elements. Every opening element (i.e. "<company>") must also contain a closing element (i.e. "</company>"). The closing element consists of the name of the opening element, prefixed with a slash ("/").

XML is case-sensitive. While "<company ></company>" is well-formed, "<COMPANY></company >" and "<Company></cOMPANY>" are not. Also, if the element does not contain text or other elements, the closing tag may be abbreviated by simply adding a slash ("/") before the closing bracket in the element (e.g., "<company></company>" can be abbreviated as "<company/>"). In addition to the rules defining opening and closing tags, it is important to note that in order to create a well-formed XML document, the elements must be properly nested.

All attribute values must be contained within quotation marks. For example, id="1" is correct, while id=1 is not acceptable. Where elements represent the nouns contained in an XML document, attributes represent the adjectives that describe the elements.

Thus in the XML of FIG. 6, a company and two of its employees are defined. The relationship between the company (parent) and the employees (children) are also described. Note that new employees can easily be added. FIG. 7 depicts elements that are added to the example of FIG. 6.

In summary, XML is a text-based meta-language that uses tags, elements, and attributes to add structure and definition to documents. It is a markup language because it uses tags to mark-up documents and it is a meta-language because it uses the tags to give structure to documents that is in turn used as a means of communication. XML is extensible because it enables users to create their own collection of tags.

Generating an XML Document to Respect TCP/IP Data Transactions

Knowing the connection establishment, the transition state of each user data packet and the close connection procedures of TCP as well as the rules required to implement an XML document, a software program may be written to convert TCP data transactions into an XML document. The document may then be sent to an XML parser to investigate network communications problems. Both the software program and the parser may be written in C, C++, Java or any other suitable programming language. The TCP/IP transactions may be acquired through an existing application program such as TCPdump, IPtrace, IPreport etc. or through a network sniffer. A network sniffer is a program or device that monitors data traveling over a network communications line.

FIG. 8 depicts an XML document representing a generic TCP/IP connection setup. As mentioned earlier, the TCP/IP connection setup uses three data packets, each packet of course contains an IP header and a TCP header. In the example of the TCP/IP connection above, the IP header and the TCP header are taken into consideration only once. Nonetheless, the IP header and TCP header of each packet are thoroughly examined for relevant information. For example, all invariant header attributes such as port numbers and IP addresses may be captured as attributes of the header tag. In any case, the IP header is a parent element that contains a child element "TCP_header". The "TCP_header" element in turn contains child element "TCP_connection" and the "TCP_connection" contains children elements "SYN_sent", "SYN_received", "ACK_received" and "ACK_sent".

Figure 9A:
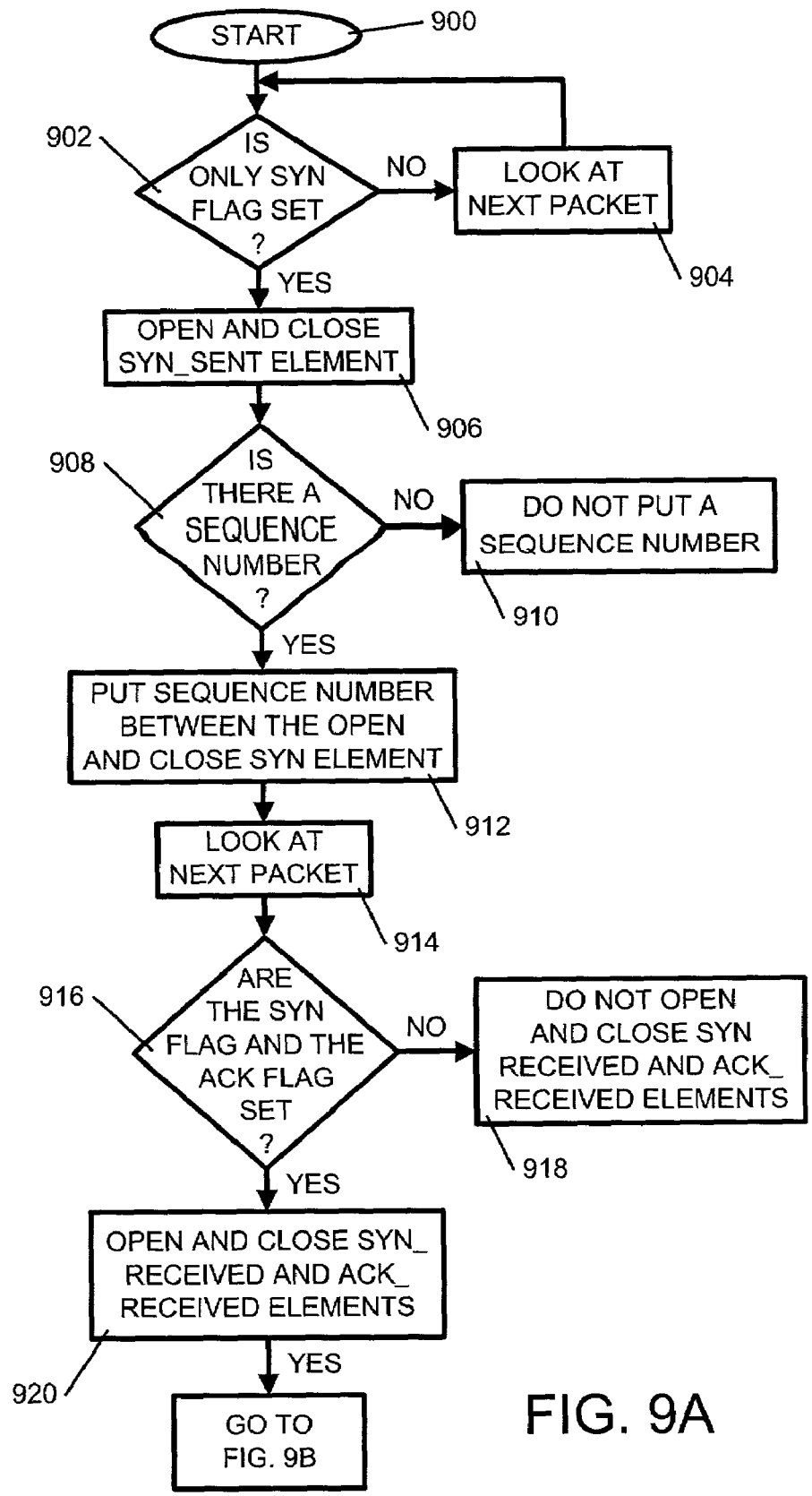
FIG. 9A is a flow chart of a program that may be used to generate an XML document of a generic TCP/IP setup connection.
Figure 9B:
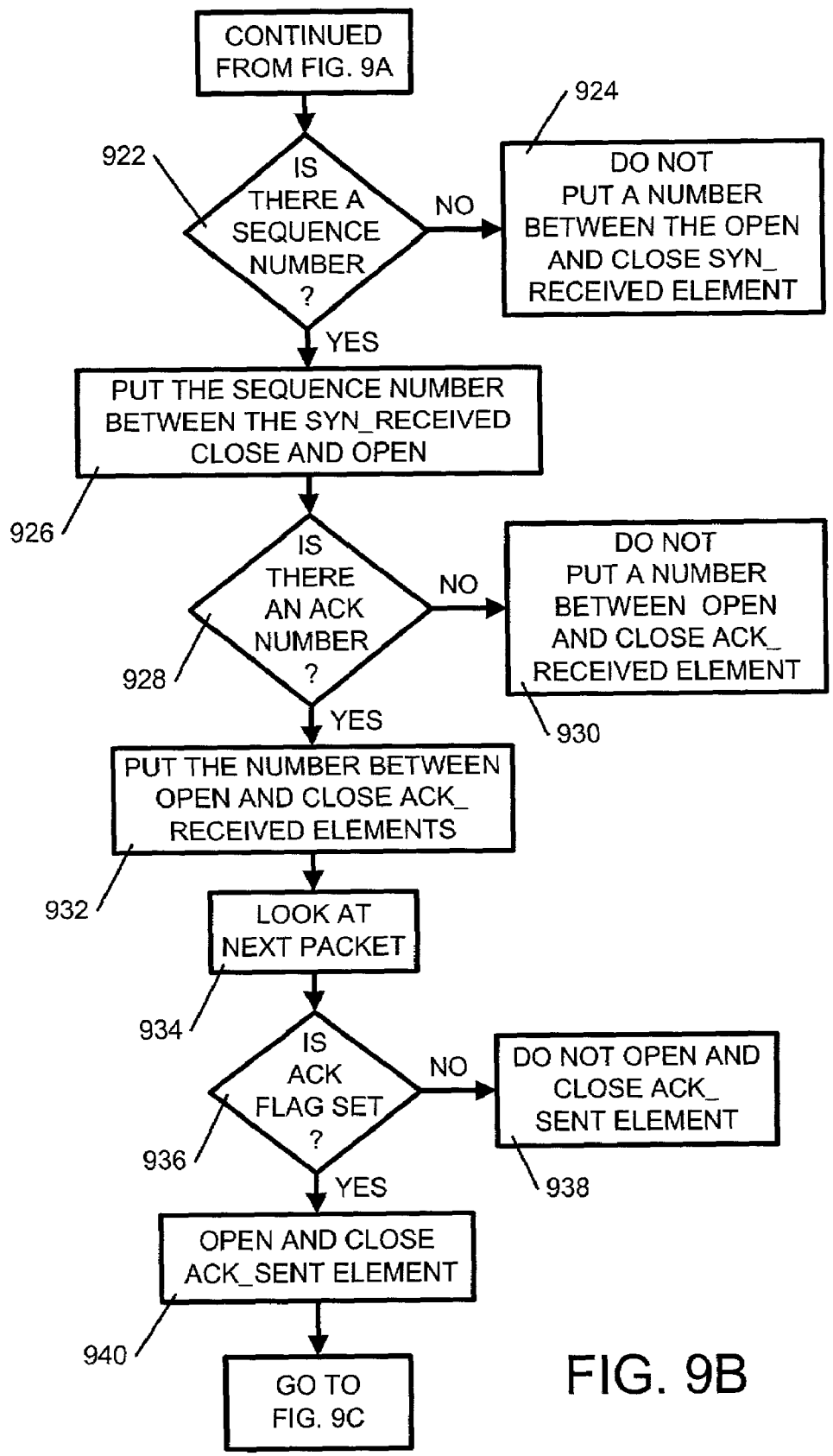
FIG. 9B is a continuation of FIG. 9A.
Figure 9C:
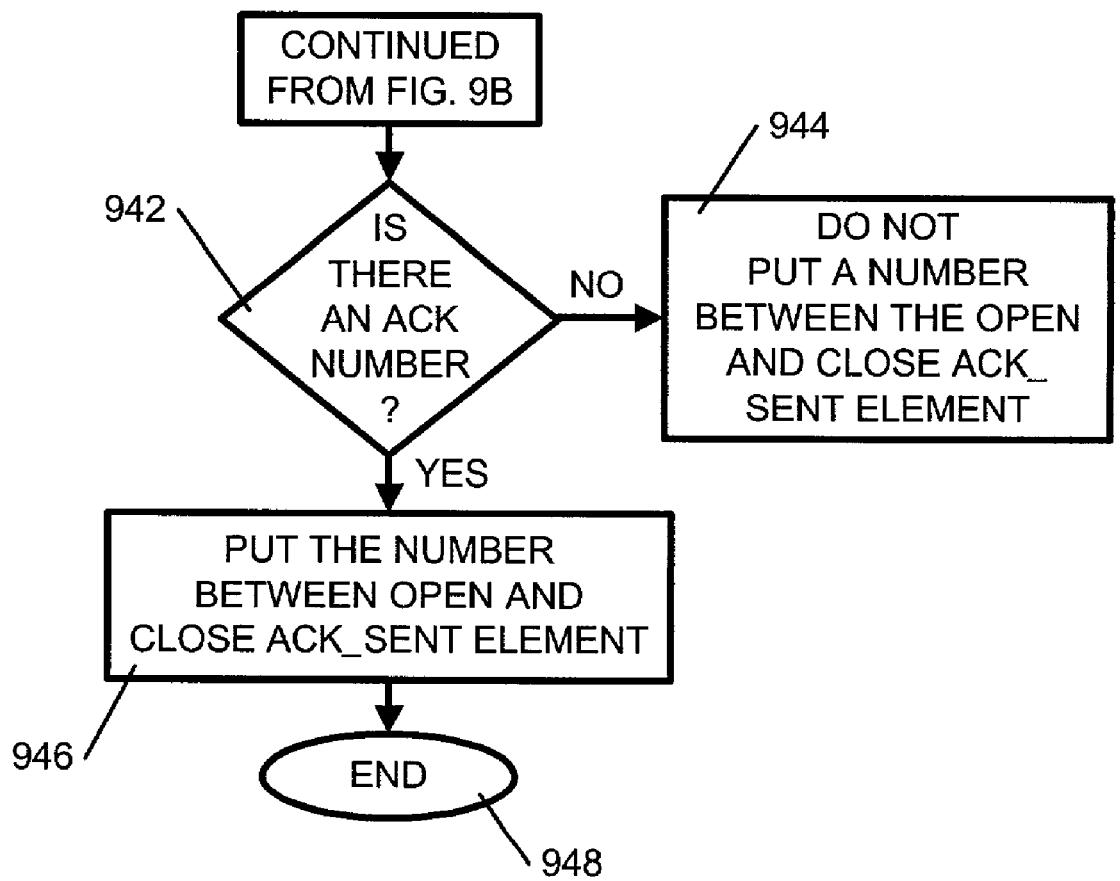
FIG. 9C is a continuation of FIG. 9B.

FIG. 9 is a flow chart of a program that may be used to generate the XML document of the TCP/IP connection setup described above. This flow chart assumes that all the data packets have an IP header and a TCP header. Of course, a program may be written to determine that it is indeed so. In any case, assuming that there are both an IP header and a TCP header, the present program will ensure that an IP header element and a TCP header element are opened and closed in accordance with the above example. Note that here, only the first three packets are taken into consideration since per TCP/IP specification the first three packets in any TCP/IP transactions are used to establish a TCP/IP connection.

The process starts when the program begins to execute (step 900). When the program gets the first packet, it determines whether the SYN flag bit 545 is set. If it is not set, the program will go on looking at the next packet in the stream of packets to determine if the SYN bit is set in that packet (steps 902 and 904). The first packet may not have the SYN bit set if, for instance, it is not part of the TCP/IP transactions being investigated. To ensure that the packet is part of the TCP/IP transactions being investigated the program may take into consideration the IP addresses in the IP header as well as the port numbers in the TCP header.

Note that the two IP addresses and the two port numbers will alternate based on the computer system that sends the data packet. For example, when the client sends a packet, its IP address will be the source IP address and the IP address of the server will be the destination IP address. If, on the other hand, the server sends the packet, its IP address will be the source IP address and the IP address of the client will be the destination IP address. Likewise, when the client sends the packet the port number that it is using for the connection will be the source port number and the port number that the server is using for that particular connection will be the destination port number. The source and destination port numbers will be reversed when the server sends the packet.

After ensuring that the packet is the first one in the transactions and the SYN bit is not set then the program will not open and close the SYN_sent element in the XML document being generated. If the SYN bit is set, the SYN_sent element will be opened and closed (steps 902 and 906). Next a check will be made to determine whether there is a sequence number in the packet. If so, the number will be inserted between the opened and closed SYN_sent element. If not, a number will not be inserted (steps 908, 910 and 912). The next packet will then be investigated to determine whether both the SYN flag and the Ack flag are set. If so, a SYN_received and an ACK_received element will be opened and closed. Next, checks will be made as to whether there are a sequence number and an acknowledgement number. If so, the sequence number will be inserted between the opened and the closed SYN_received element and the acknowledgement number between the opened and closed ACK_received element (steps 916, 918, 920, 922, 924, 926, 928, 930 and 932).

The next packet will be checked to see whether the ack flag is set. If so, the ACK_sent element will be opened and closed and the acknowledgement number will be inserted between the opening and the closing tags of the ACK_sent element if one exists (steps 936, 938, 940, 942, 944 and 946). The execution of the program then ends (step 948).

Figure 10A:
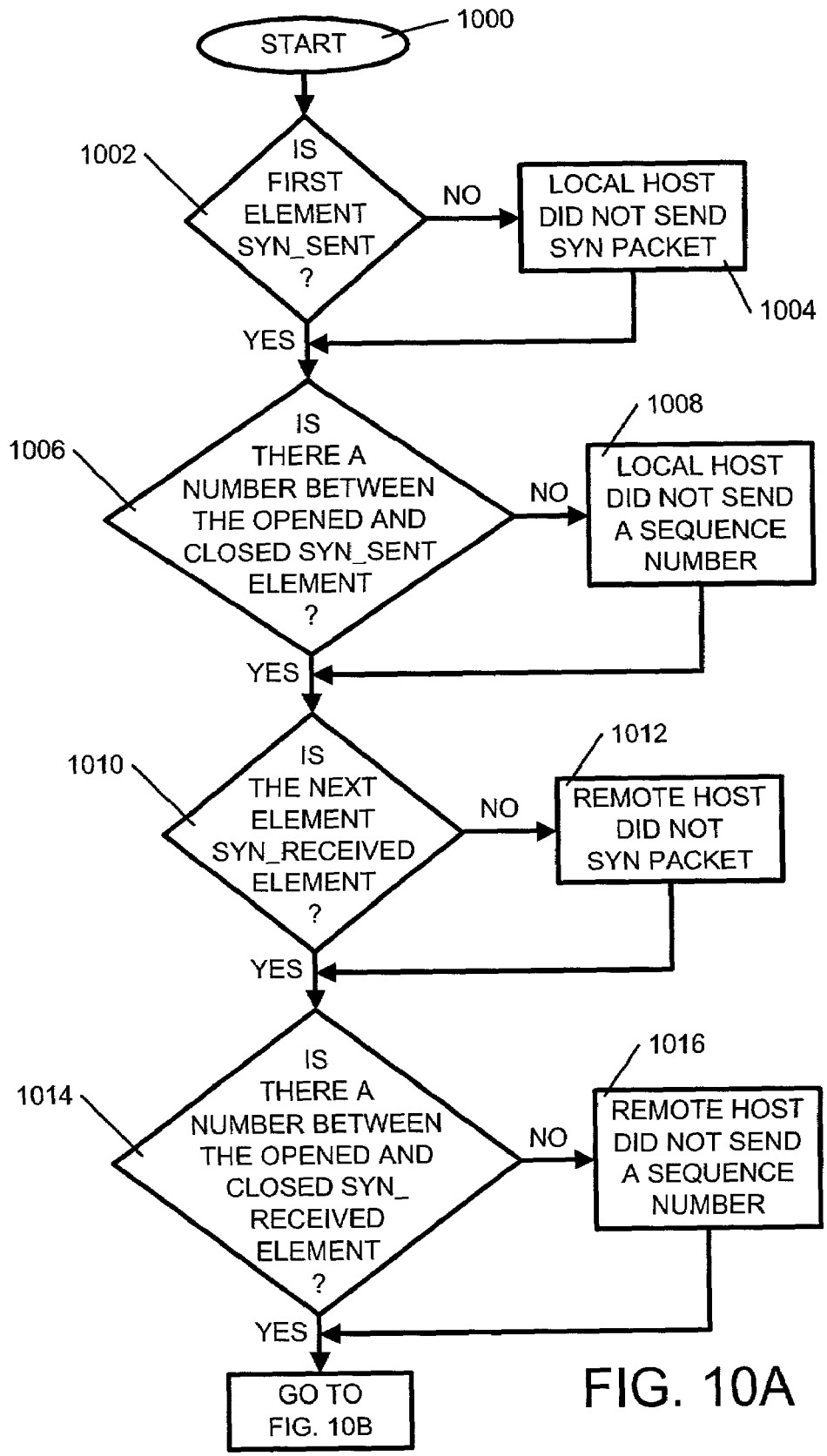
FIG. 10A is a flow chart of a process that may be used to implement a parser to parse an XML document.
Figure 10B:
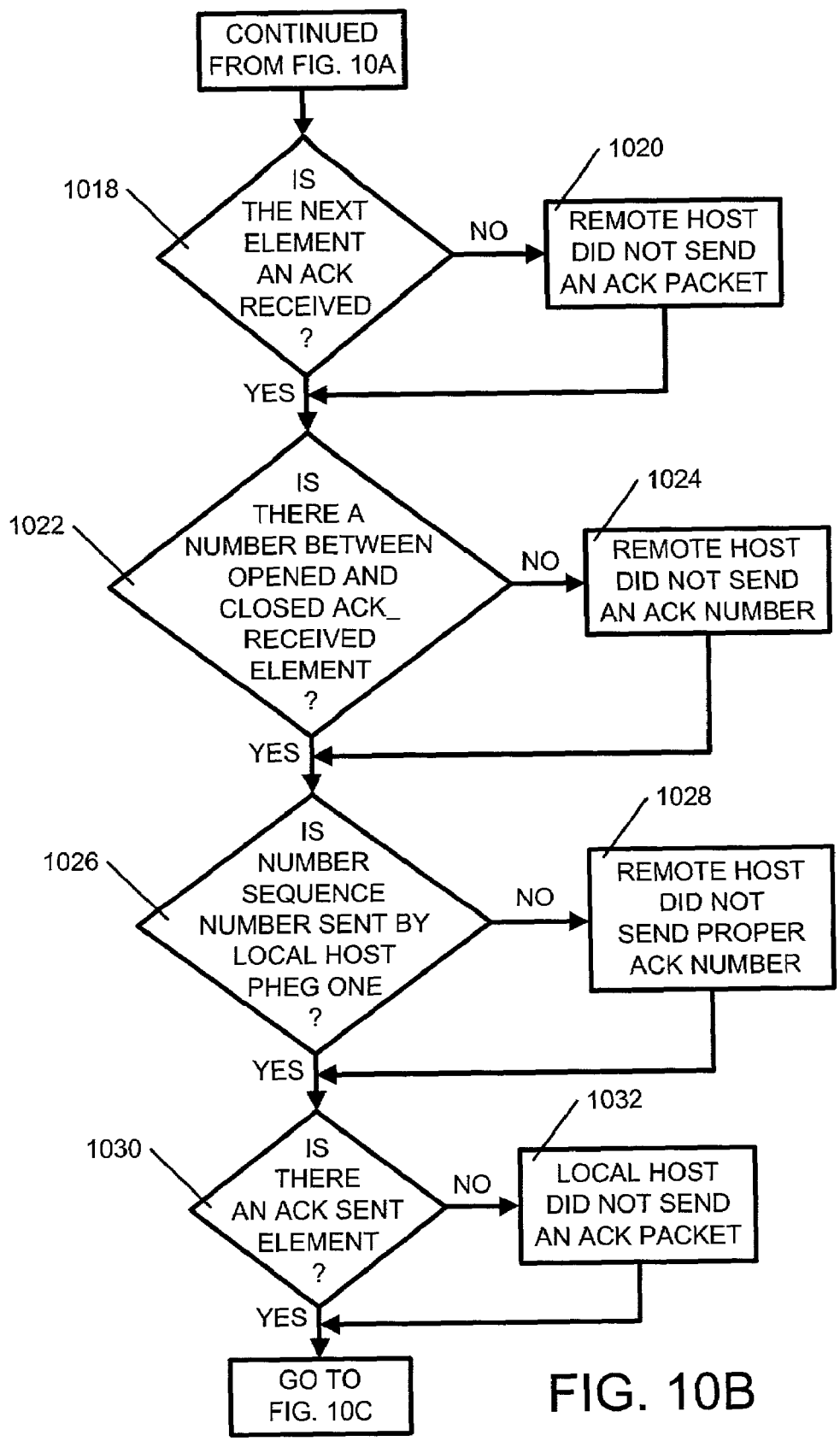
FIG. 10B is a continuation of FIG. 10A.
Figure 10C:
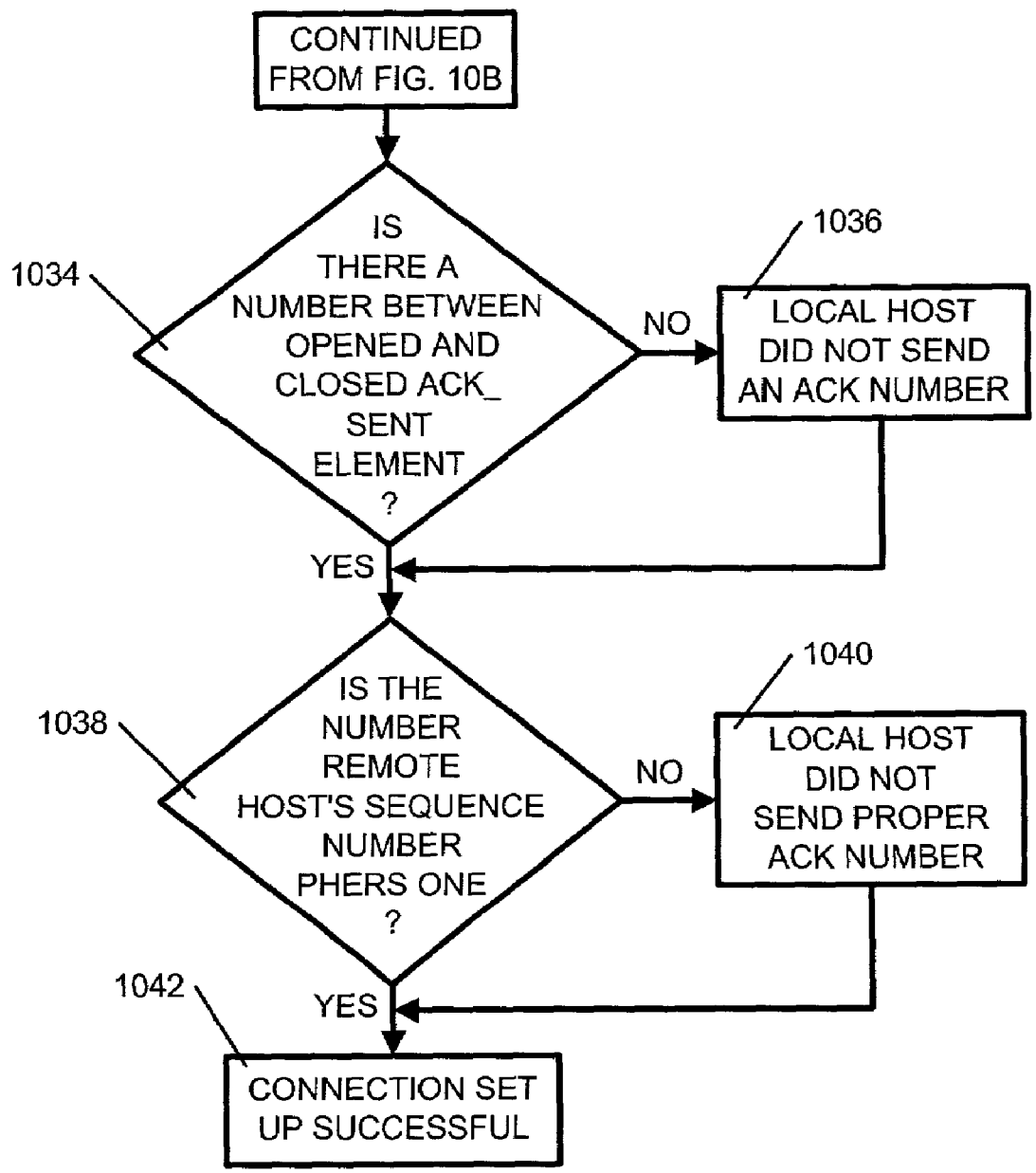
FIG. 10C is a continuation of FIG. 10B.

A parser may be implemented to notify a user as to whether the TCP/IP connection sequence was proper. FIG. 10 is a process that may be used to implement the parser. In this case, the XML document generated above will be fed into the parser. The process starts with the execution of the parser (step 1000). The parser will check to see whether there are a SYN_sent element and a sequence number between the opened and closed SYN_sent element. If not, an appropriate error message may be generated (steps 1002, 1004, 1006 and 1008). Then the parser will check to determine whether there are a SYN_received element and a number between the opened and closed SYN_received element. If not, an appropriate error message may be generated (steps 1010, 1012, 1014 and 1016). The parser will continue to check to see whether there are an ACK_received element and an ACK_sent element, whether there is a number between the opened and closed ACK_received and ACK_sent elements and whether these two numbers are the expected numbers. If not, appropriate messages may be generated; otherwise, a "connection setup successful" message may be generated (steps 1018–1042).

For the application presenting the XML document to the user to properly interpret the markup tags, a schema must be developed. As alluded to before, the purpose of an XML schema is to define and describe a class of XML documents by using schema components to constrain and document the meaning, usage and relationships of the constituent parts of the documents. Schemas may also provide for the specification of additional document information, such as normalization and default attribute and element values. Schemas have facilities for self-documentation. Thus, an XML schema can be used to define, describe and catalogue XML vocabularies for classes of XML documents.

FIG. 11 depicts an XML schema for the generic TCP/IP setup connection. In the schema, IP_header, TCP_header, SYN_sent, SYN_received, ACK_received and ACK_sent are all defined as elements. Their types are also defined (e.g., complextype or simpletype). In this case, "ref" is used for simpletype. Sequence is a compositor that defines an ordered sequence of sub-elements or children. Note that each element that is opened is also closed. Note also that the schema is developed based on the state transition of the packets being transmitted (i.e., SYN, SYN&ACK and ACK packets). Thus, a schema may be developed for any packet state transitions. Once a schema is developed, the entries in the XML document may correctly be interpreted.

Note that an XML document may be generated for all data packets including the packets used during the TCP/IP close connection sequence. As before, an XML schema must be developed to correctly interpret the elements.

FIG. 12 depicts an XML document representing a generic TCP/IP close connection sequence. As with the TCP/IP setup connection process, a program may be written to automatically generate the XML document of the close connection sequence. In this case, a check will be made to ensure that both ends of the TCP/IP connection have sent a FIN packet. If so, the program will ensure that the proper elements are opened and closed if they are present and numbers are inserted in the proper place if present just as was done in the TCP/IP connection setup. A parser may be generated to notify the user as to whether the close connection process was properly executed. If not, appropriate error messages will be generated. Otherwise, a "close connection setup successful" may be generated.

Figure 13A:
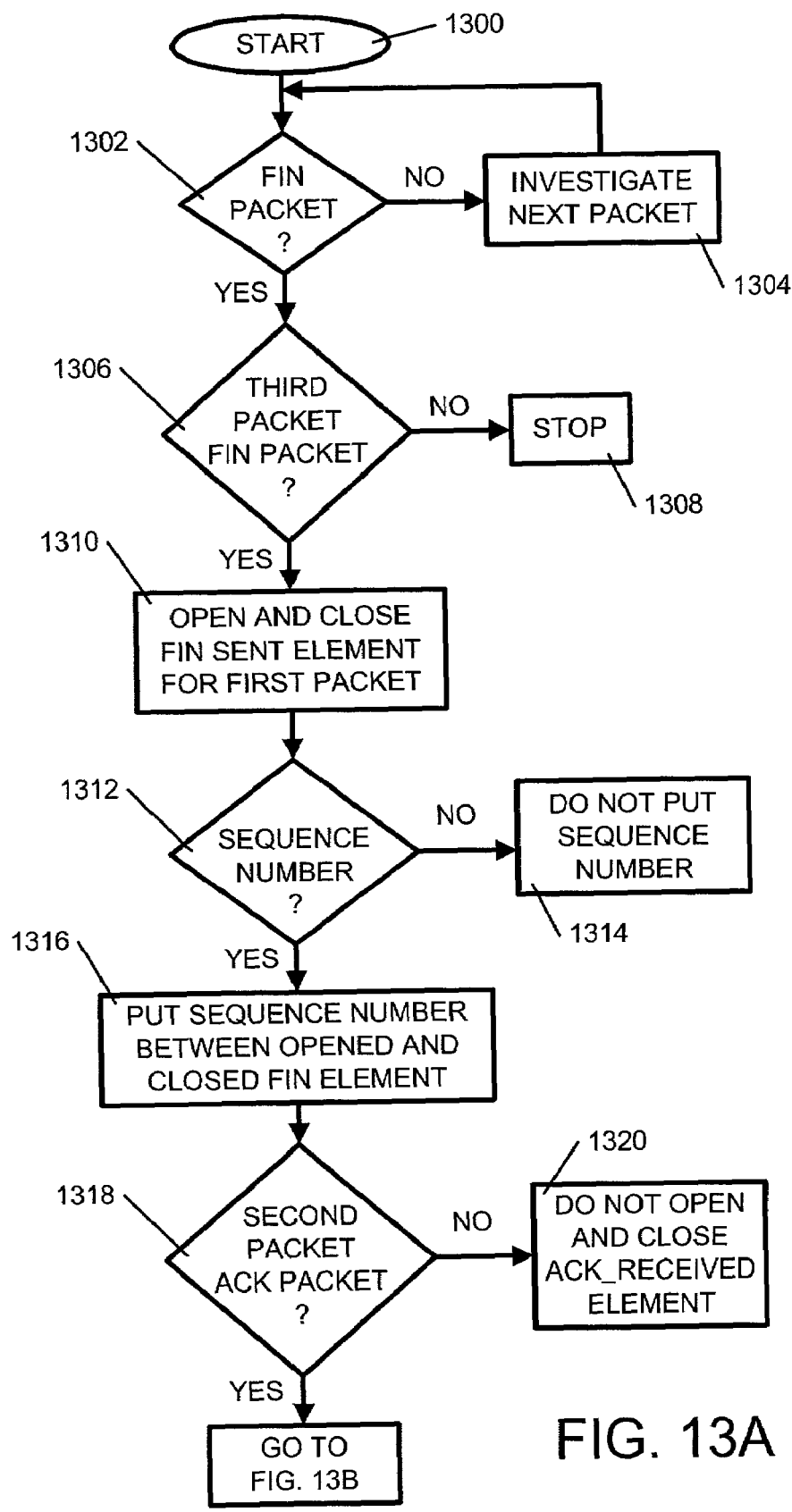
FIG. 13A is a flow diagram of a program that may be used to generate an XML document for a generic TCP/IP close connection process.
Figure 13B:
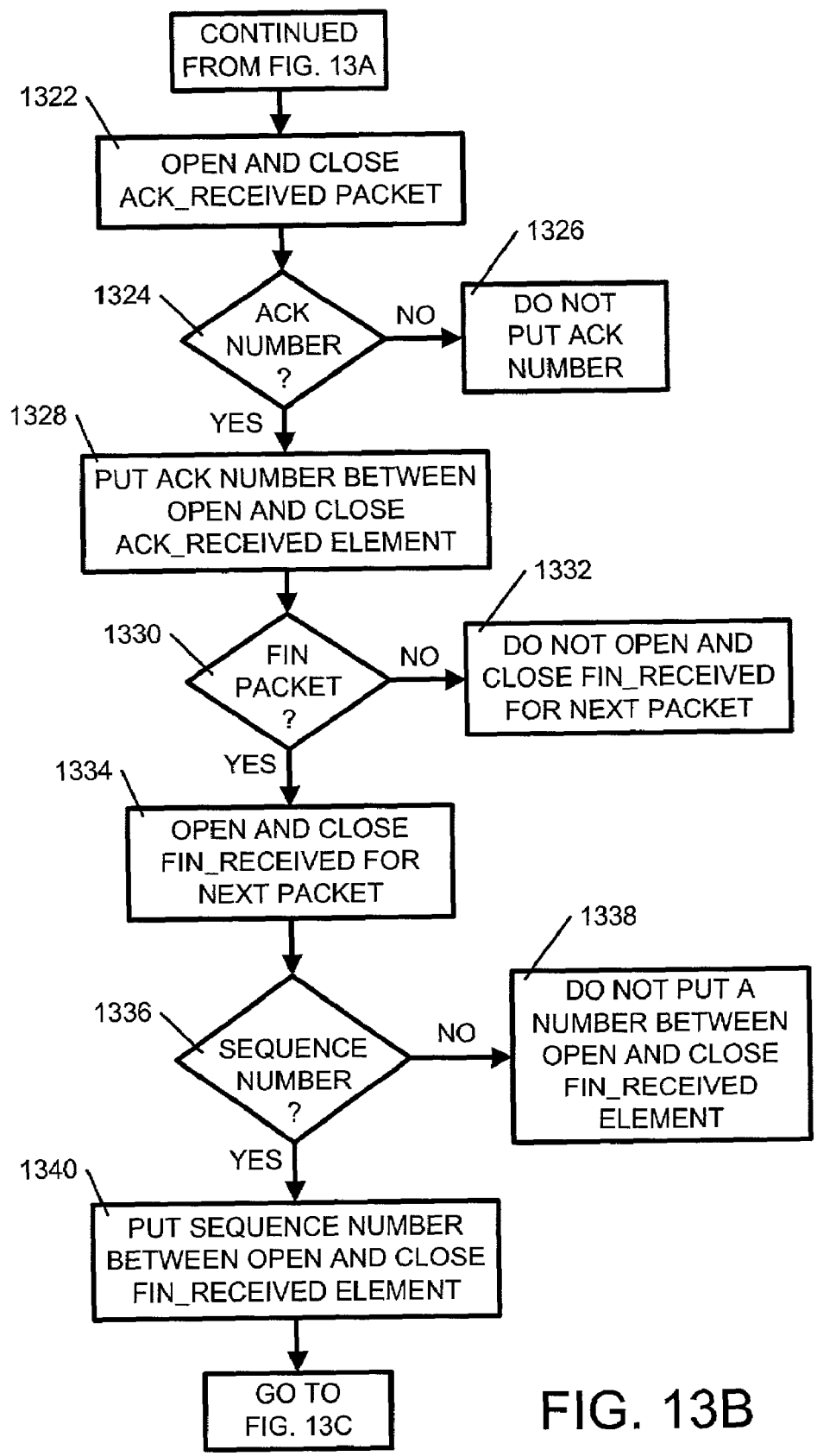
FIG. 13B is a continuation of FIG. 13A.
Figure 13C:
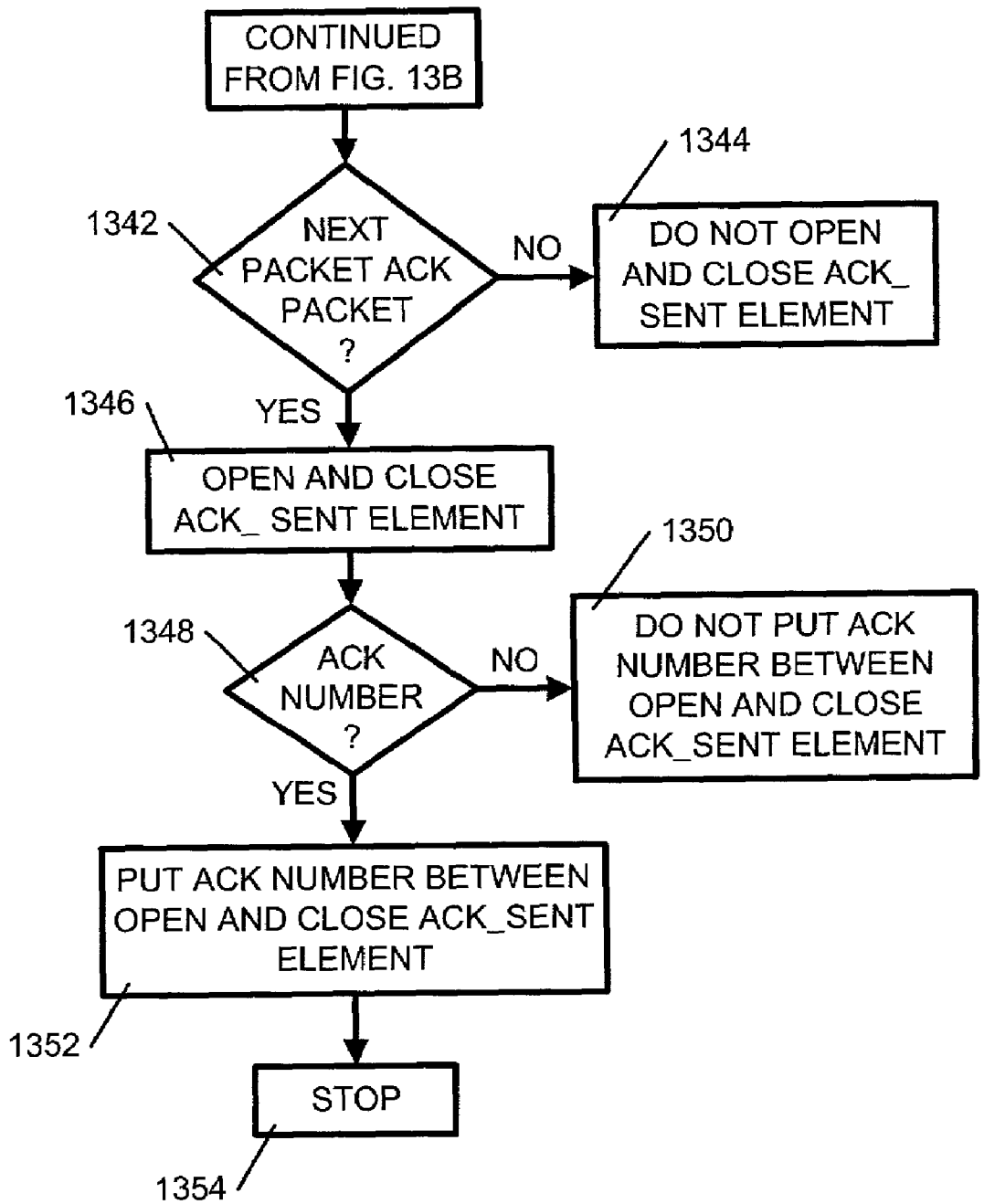
FIG. 13C is a continuation of FIG. 13B.

FIG. 13 is a flow diagram of a program that may be used to generate the XML document outlining the TCP/IP close connection setup. The program will check to ensure that both ends of the network transaction have sent a FIN packet as per the XML specification. If so, then the TCP/IP connection is being closed. Consequently, the program will ensure that the four packets, starting with the first FIN packet, are the proper packets and the program will open and close a FIN_sent element, an ACK_received element, a FIN_received element and an ACK_sent element and the appropriate numbers will be inserted between each open and close element (steps 1300–1354).

Figure 14A:
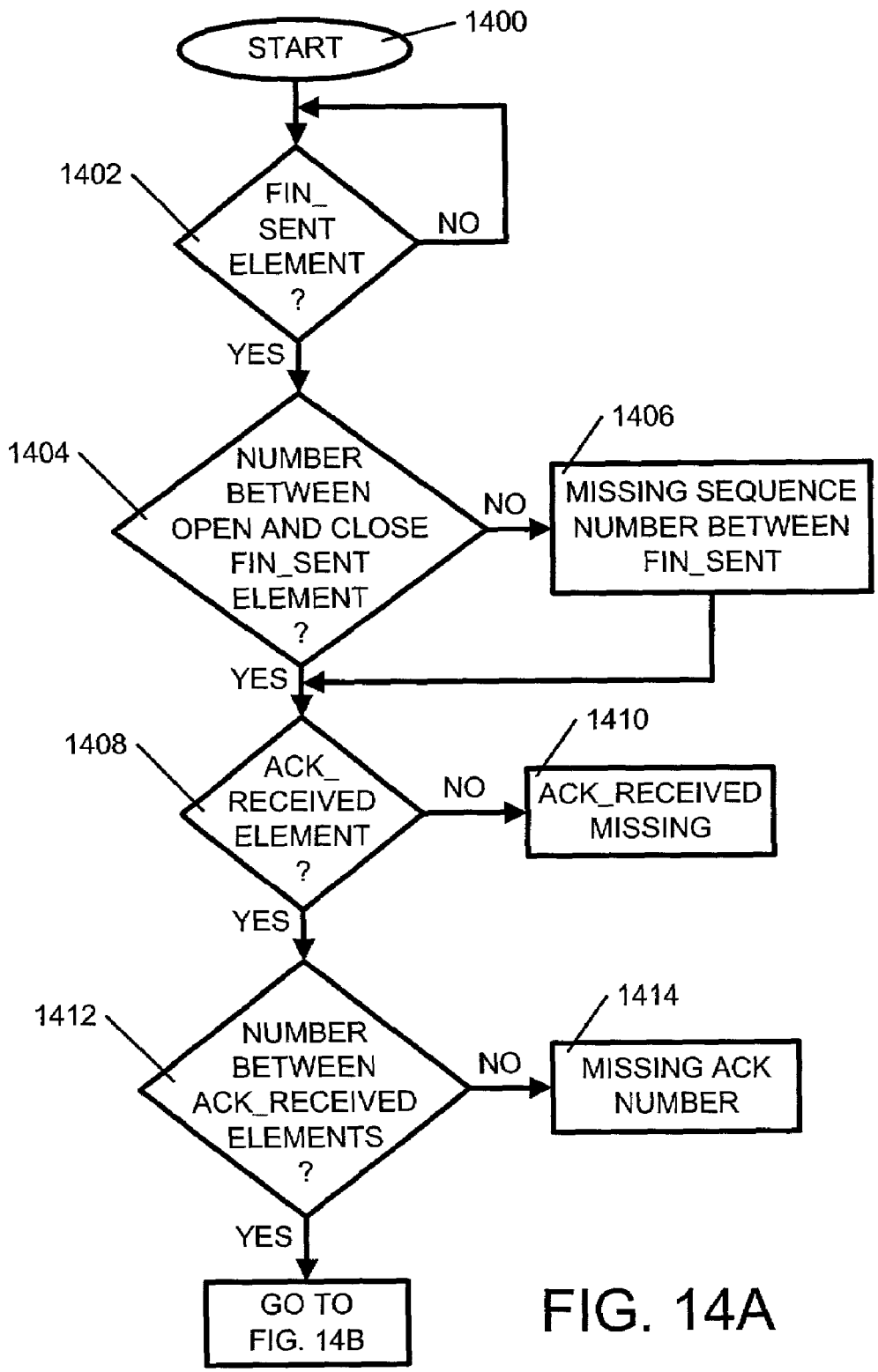
FIG. 14A is a flow diagram of a parser that may be used to notify a user whether a generic close setup connection was successful.
Figure 14B:
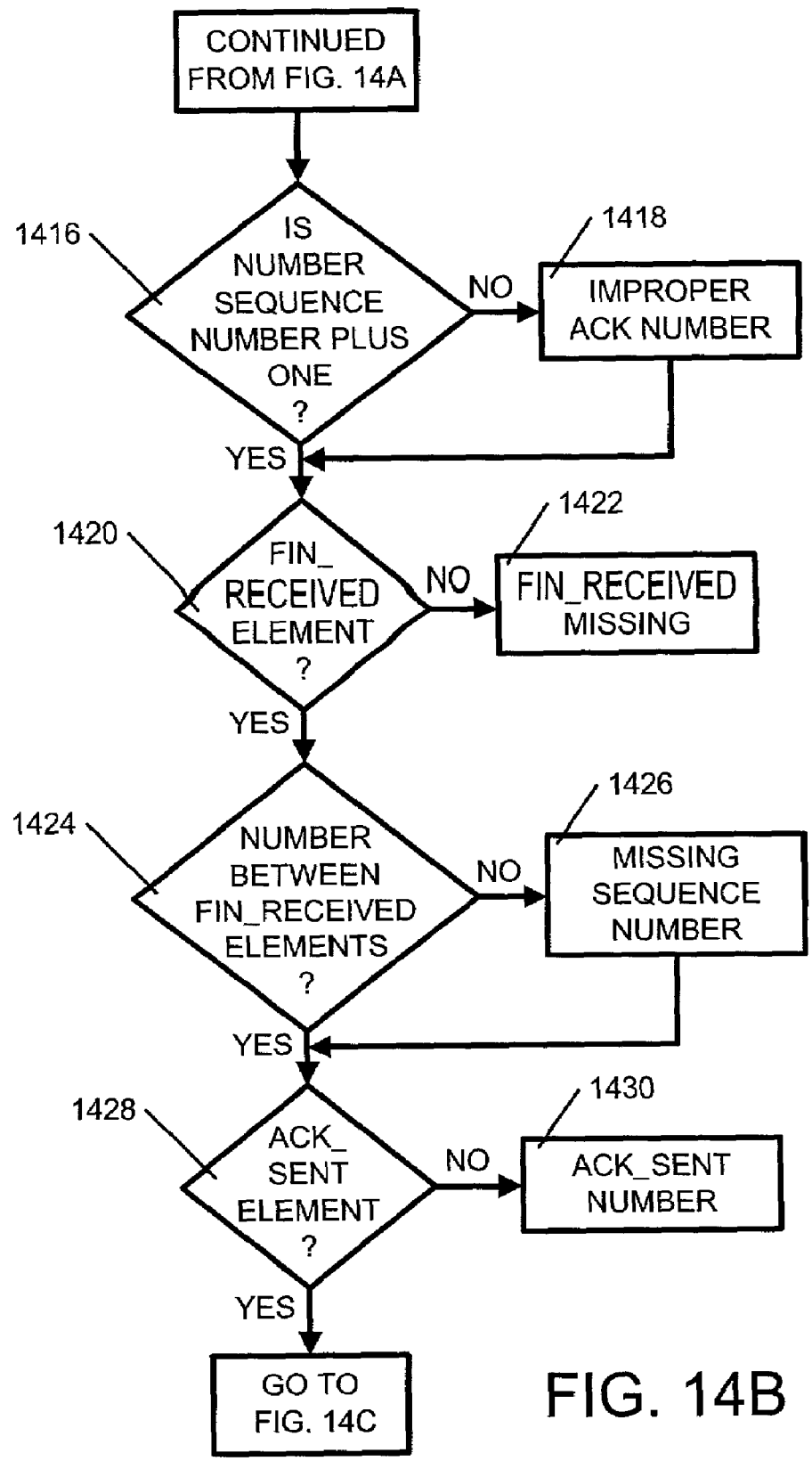
FIG. 14B is a continuation of FIG. 14A.
Figure 14C:
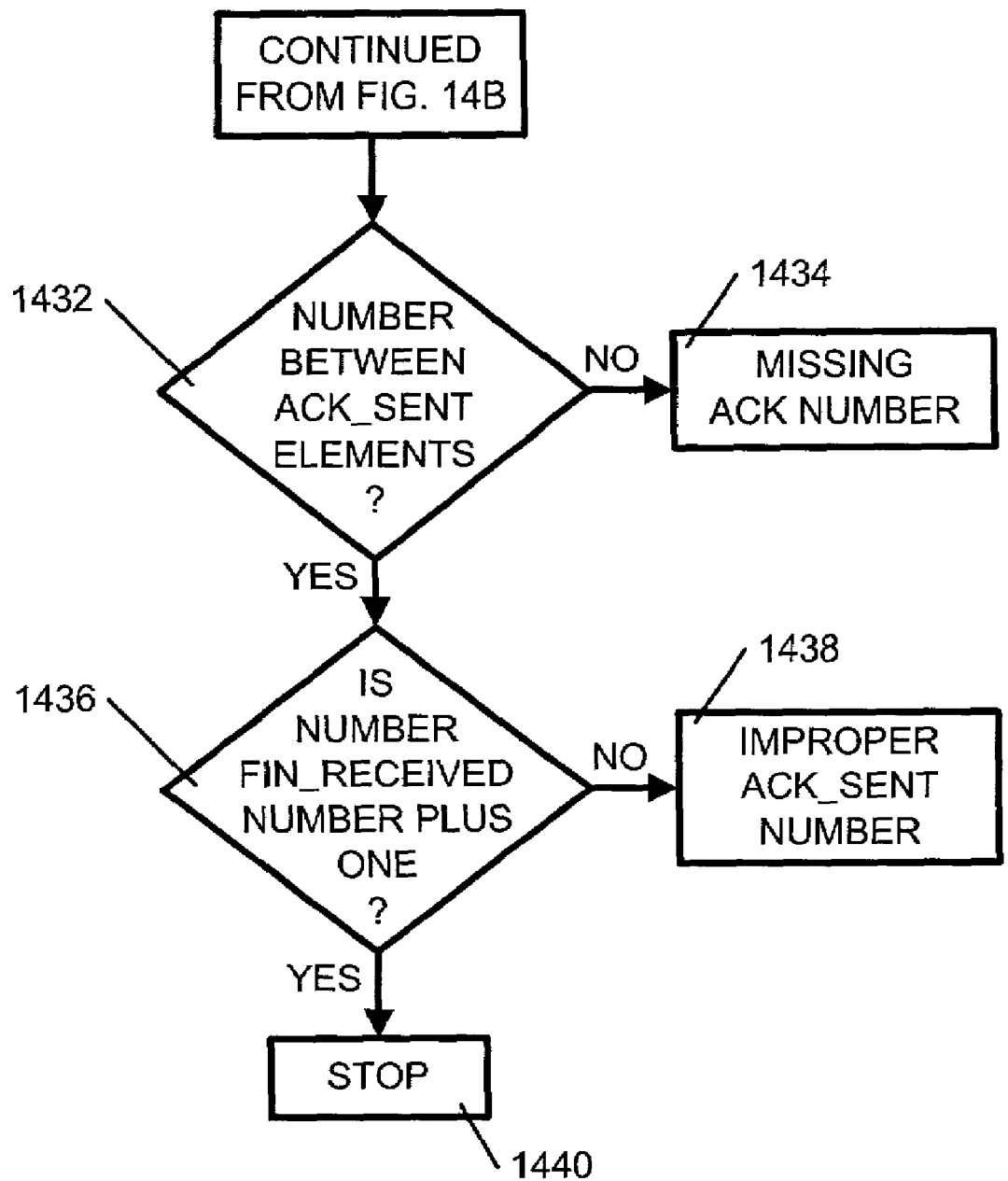
FIG. 14C is a continuation of FIG. 14B.

FIG. 14 is a flow diagram of a parser that may be used to notify the user whether the close setup connection was successful. The parser will ensure that all the open and close elements are present and in the proper sequence in the XML document. The parser will also ensure that the proper numbers are inserted between an open and close element. If there is any discrepancy between what is expected and what is actually in the document, the parser may generate an error to notify the user (steps 1400–1440).

Again a schema needs to be generated to validate the XML document representing the close connection sequence. FIG. 15 is a schema for the close connection sequence.

The TCP/IP setup connection process in FIG. 8 was for a generic connection. FIG. 16 depicts a TCPdump for a TCP/IP packet exchange for a remote login connection setup. A TCPdump is publicly available program that captures and outputs the TCP packet exchanges between two end points of a network connection. Each line in FIG. 16 represents a packet. The first line (first packet) may be deciphered as TCP port 1023 on host "gil" sending a SYN packet to the login port on host "devo". The sequence number is 768512 and contained no data. The window size is set at 4096 and the maximum segment size is 1024. In the second line (second packet) host "devo" replied with a SYN, ACK packet. The sequence number is 947648 and it also contained no data. The acknowledgement number is 768513 which acknowledges the afore-said SYN packet. The window size is 4096 and maximum segment size 1024. In the third line (i.e., third packet) "gil" responded with an ACK packet and the acknowledgement number is 947649 and window size is 4096. At that point the connection is opened.

The XML document representing this specific TCP/IP connection setup is illustrated in FIG. 17. Here, attributes to the TCP_header are local and remote ports (i.e., 1023 and login), local and remote IP addresses (i.e., gil and devo) and the application initiating the TCP/IP setup connection (i.e., rlogin). Note that the IP addresses are expressed in terms of the names of the computer systems. It is well known in the field that if the name of a computer system is known, its IP address may easily be obtained.

In this case, the reverse address resolution protocol (RARP) may be used to find the IP address. ARP (address resolution protocol) is the protocol used by TCP/IP to convert a physical address into an IP address. A computer system wishing to find out an IP address of another computer system broadcasts an ARP request onto the network. A computer system on the network that has the IP address responds with its physical address. RARP, on the other hand, is used to obtain a computer system's own IP address. A computer system wishing to find out its own IP address broadcasts its own physical address on the network and the RARP server (the server that assigns IP addresses to the computer systems in the network) will reply with the computer system's IP address.

In any case, a program may be written to generate the specific TCP/IP connection outlined above. Furthermore, a parser may be written to investigate any network communications problem that a user may encounter.

As with the TCP/IP setup connection, based on the state transition diagram of this specific TCP/IP connection, an XML schema may be developed for proper interpretation of the elements.

An XML document for user data may also be generated. This would include the TCP/IP setup connection, user data packet transactions and the close connection sequence. Of course, an XML schema will also have to be developed for proper interpretation of the elements used. When the document is passed through an appropriate parser, if no errors are encountered, the parser may generate an output such as that depicted in FIG. 18. Note that this is a high level view of the output of the parser.

Debugging

As mentioned in the discussion above, a parser may be developed to investigate communications errors. The parser uses as input the XML document representing the packets exchanges. If the XML document is well formed, then there are not any network communications errors. If the document is not well formed, the parser will pinpoint the errors. FIGS. 19 and 20 depict two XML documents. Based on the specification of the TCP/IP setup connection, both XML documents are not well formed. Therefore, the TCP/IP connections would not have been established. In FIG. 19, the SYN_Received element comes before the SYN_Sent element. This indicates then that the packets were not exchanged in the order specified in the specification and thus the reason why the connection was not established. A parser (e.g., FIG. 7) should quickly point that out.

The second XML document is missing the SYN_Sent packet altogether. Again, the parser should point this fact as the reason the connection was not established. In addition, neither one of the two XML documents would be validated against the connection setup schema described above as the elements do not follow the proper sequence in the schema.

Note also that the parser will ensure that the proper numbers are present. For example, when setting up and closing a TCP/IP connection, the ACK number sent should be the sequence number received plus one. If this is not so, the parser will notify the user of the discrepancy.

Thus, when network data transactions are expressed using XML documents, investigations of network communications errors are greatly simplified. Indeed, a user may merely look at the generated document (i.e., a parser need not be used) to uncover the errors.

Simulation

Furthermore, a user may use the XML documents to perform network protocol simulation. Clearly, any change made to the XML document is in effect a change made to the packet exchanges. Consequently, using the XML documents a user may analyze the properties of the packets, modify as well as create new exchanges and study the effects of the changes on the packets. Thus, performance modeling and analysis may easily be performed using XML documents.

By modifying the network protocol's state transition diagram, the user can cause subtle/major changes in network behavior, traffic pattern, response pattern, response time, congestion etc. Through network behavior analysis the user can visualize and analyze the effects of the modification. This can be illustrated graphically, for example. XML is a useful tool for such analysis and using the technique described here will lead to a simple mechanism for specification of protocol behavior and the corresponding simulation and analysis of the behavioral response pattern.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of generating an eXtensible Markup Language (XML) document to represent network protocol connection setup between two computers comprising the steps of:
- capturing data packet exchanges between two computers initiating a network connection;
- identifying contents of the packet exchanges, the contents including parameters indicating request for the network connection and acknowledgement of the request;
- generating the XML document using the contents of the packet exchanges wherein the parameters are used as elements in formatting the XML document; and wherein the XML document is generated based on the network protocol in use.

2. The method of claim 1 wherein the packet exchanges are fed through a program to generate the XML document.

3. The method of claim 2 wherein the XML document is validated using an XML schema.

4. The method of claim 1 wherein the packet exchanges between the two computers include parameters indicating request for closing the network connection and acknowledgment of the request for closing the network connection.

5. A computer program product on computer readable medium for generating an eXtensible Markup Language (XML) document to represent network protocol connection setup between two computers comprising:
- code means for capturing data packet exchanges between two computers initiating a network connection;
- code means for identifying contents of the packet exchanges, the contents including parameters indicating request for the network connection and acknowledgement of the request;
- code means for generating the XML document using the contents of the packet exchanges wherein the parameters are used as elements in formatting the XML document; and wherein the XML document is generated based on the network protocol in use.

6. The computer program product of claim 5 wherein the packet exchanges are fed through a program to generate the XML document.

7. The computer program product of claim 6 wherein the XML document is validated using an XML schema.

8. The computer program product of claim 5 wherein the packet exchanges between the two computers include parameters indicating request for closing the network connection and acknowledgment of the request for closing the network connection.

9. An apparatus for generating an eXtensible Markup Language (XML) document to represent network protocol connection setup between two computers comprising:
- means for capturing data packet exchanges between two computers initiating a network connection;
- means for identifying contents of the packet exchanges, the contents including parameters indicating request for the network connection and acknowledgement of the request;
- means for generating the XML document using the contents of the packet exchanges wherein the parameters are used as elements in formatting the XML document; and wherein the XML document is generated based on the network protocol in use.

10. The apparatus of claim 9 wherein the packet exchanges are fed through a program to generate the XML document.

11. The apparatus of claim 10 wherein the XML document is validated using an XML schema.

12. The apparatus of claim 9 wherein the packet exchanges between the two computers include parameters indicating request for closing the network connection and acknowledgment of the request for closing the network connection.

13. A computer system for generating an eXtensible Markup Language (XML) document to represent network protocol connection setup between two computers comprising:
- at least one memory device for storing code data; and
- at least one processor for processing the code data to capture data packet exchanges between two computers initiating a network connection, identify contents of the packet exchanges, the contents including parameters indicating request for the network connection and acknowledgement of the request, and to generate the XML document using the contents of the packet exchanges wherein the parameters are used as elements in formatting the XML document and wherein the XML document is generated based on the network protocol in use.

14. The computer system of claim 13 wherein the packet exchanges are fed through a program to generate the XML document.

15. The computer system of claim 14 wherein the XML document is validated using an XML schema.

16. The computer system of claim 13 wherein the packet exchanges between the two computers include parameters indicating request for closing the network connection and acknowledgment of the request for closing the network connection.

* * * * *